Figure 1:
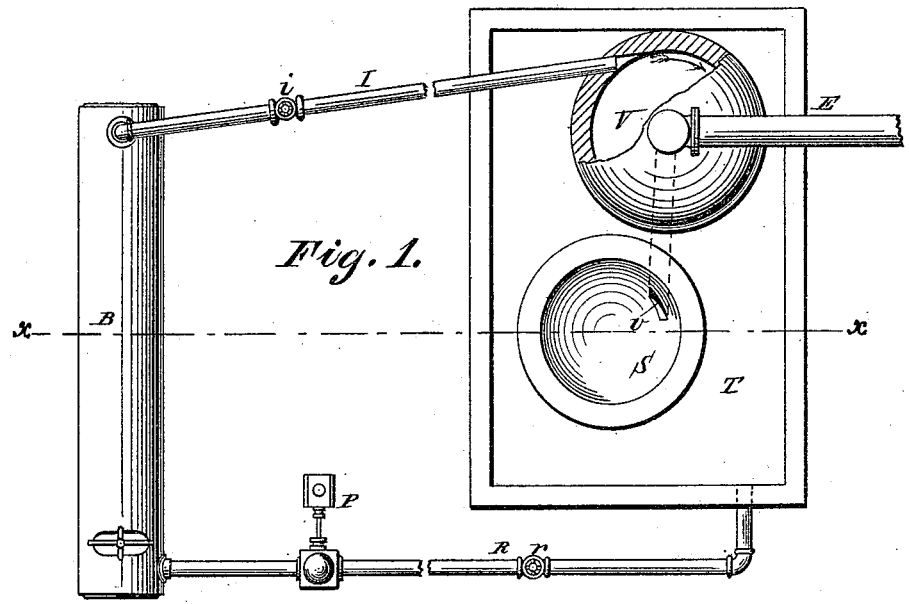

(No Model.) 2 Sheets—Sheet 1.

C. C. PECK.
PROCESS OF EVAPORATING LIQUIDS.

No. 438,385. Patented Oct. 14, 1890.

(No Model.) 2 Sheets—Sheet 2.

C. C. PECK.
PROCESS OF EVAPORATING LIQUIDS.

No. 438,385. Patented Oct. 14, 1890.

Witnesses:
D. W. Gardner
G. T. Miatt

Inventor:
Cassius C. Peck
By his Attorney
Geo. W. Miatt

UNITED STATES PATENT OFFICE.

CASSIUS C. PECK, OF WARSAW, NEW YORK.

PROCESS OF EVAPORATING LIQUIDS.

SPECIFICATION forming part of Letters Patent No. 438,385, dated October 14, 1890.

Application filed December 28, 1889. Serial No. 335,194. (No model.)

*To all whom it may concern:*

Be it known that I, CASSIUS C. PECK, a citizen of the United States, residing at Warsaw, in the county of Wyoming and State of New York, have invented a certain new and useful Process of Evaporating Liquids, of which the following is a description sufficient to enable others skilled in the art to which the invention appertains to use the same.

My invention is applicable to the evaporation or concentration of liquids generally, and especially to the treatment of such as precipitate granular or other solid matter as the evaporation proceeds—as, for instance, in the manufacture of salt from brine, to which latter special use I shall hereinafter, mainly for the sake of convenience, confine myself in referring to the process.

One object of my invention is to provide for the carrying on of the evaporating process upon a larger scale than heretofore possible by increasing the effectiveness of vacuum apparatus of a given capacity as compared with older methods and apparatus, and another object is the production of a product of a finer grain and more uniformity than heretofore.

The first feature of my invention consists in the process herein set forth of imparting to the brine or other liquid to be treated a comparatively high degree of heat in a separate closed heating-chamber, and then introducing the heated liquid into a chamber in which a comparatively high vacuum is maintained, the heated liquid being introduced into the said vacuum-chamber below the liquid-level therein and caused to circulate freely between the separate closed heater and the lower part of said vacuum-chamber. By this means a relatively larger area of heating-surface may be employed by which the liquid under treatment in the vacuum-chamber may be maintained at a higher temperature than has heretofore been possible, the circulation of the liquid under treatment between the interior of the vacuum-chamber and the exterior heating apparatus augmenting the evaporation within the vacuum-chamber and rendering the process of evaporation continuous.

A distinguishing feature of my invention is the introduction of the heated brine or other liquid under treatment into the vacuum-chamber below the level of the liquid contained therein in contradistinction to the old method of introducing the feed-supply into the vapor-space above the level of the liquid under treatment in the chamber. Where the supply is delivered above the liquid-level, an undue degree of agitation results, and a portion of the brine is carried over with the vapor into the condenser, thereby creating a loss of both brine and heat. Owing, also, to the predisposition of the saturated and heated brine or other liquid under treatment to vaporize on its release from pressure at the instant of its escape from the supply-pipe into the vapor-space, in practice such supply-pipes or passages rapidly become closed and inoperative by reason of the precipitation of fine crystals, which form a hard incrustation in and around the mouth of the passage, the removal of which involves much trouble, delay, and expense, since it can only be done by slowly dissolving the incrustation in unsaturated water. These objectionable features I obviate by situating the mouth of the supply pipe or passage below the surface of the body of liquid contained in the vacuum-chamber, so that the orifice is submerged at all times, the action of the entering brine under these conditions tending constantly to wash out and keep clear the passage, and the total evaporation in the vacuum-chamber taking place exclusively and evenly from and over the entire liquid-surface, the fresh brine mingling uniformly with the body of brine already in the chamber, and the vapor-bubbles rising steadily and easily through the evenly-distributed continuously-circulating mass of brine, separating themselves at the surface without opposition, and rising freely through the clear vapor-space in the upper part of the chamber above. The apparatus for effecting this interchange or circulation of the liquid under treatment between the vacuum-chamber and the exterior heating-surface may be so arranged that the liquid will flow and circulate naturally between the two, the cooler liquid from the lower portion of the vacuum-chamber flowing back to the heater, as the hotter liquid is received from the heater into the vacuum-chamber at a higher level.

The natural or gravity circulation above referred to will answer where the process is, owing to the nature of the liquid under treatment or the result sought, necessarily or designedly slow; but where rapid evaporation is desirable, as in the case of brine and other liquids from which crystalline precipitates are obtained, I employ a forced circulation of the liquid between the vacuum-chamber and the heating apparatus, thereby augmenting the amount of evaporation within the vacuum-chamber, and at the same time preventing or counteracting the tendency to incrustation and securing the deposit of crystals of uniform size.

I have discovered that by regulating the direction and flow of the liquid I am enabled to control the size and character of the crystals formed, and an important feature of my invention consists in regulating and directing the flow or motion of the liquid under treatment within the vacuum-chamber itself by causing it to assume a rotary or gyratory movement therein, the liquid from the heater being injected into the vacuum-chamber in a line which is substantially tangential thereto. The continuous uniform movement of the liquid under treatment within the vacuum-chamber in one direction and the absence of conflicting currents or agitation practically prevent the formation of irregular crystals of large size and insure the production of a finer and more uniform grade of salt than has heretofore been attainable by the evaporation of brine. In connection with this method of imparting a rotary or gyratory movement to the liquid in the vacuum-chamber my invention includes the removal of crystals and more concentrated liquid centrally from the lower part of the vacuum-chamber, it having been found by me by practical operation that a comparatively slow central discharge of the liquid rotating in the vacuum-chamber has a tendency to collect concentrated liquid and crystals axially, at the same time contributing to prevent the formation of crystals of large size. The circular or gyratory movement of the liquid within the vacuum-chamber is comparatively slow and insufficient to throw the heavier or solid matter outward against the sides of the chamber by centrifugal force, as would be the result if the gyratory speed were increased to a sufficient degree. Practically, however, the crystals and concentrated liquid as formed in the slowly-rotating liquid collect in the comparative quiet of the axial line of rotation, down which they sink to the central discharge at the bottom, the vortex created being sufficient to counteract the centrifugal force involved.

Still another feature of my improved process consists in utilizing the gyratory movement just described as imparted to the liquid in the vacuum-chamber for the further purpose of separating the crystals from the concentrated liquid when the products of evaporation are discharged from the lower portion of the vacuum-chamber. This I accomplish by injecting the liquid carrying the crystals into a separating-basin in a tangential line, as set forth in my application for patent for apparatus, Serial No. 334,666, filed December 23, 1889, from which basin the crystals may be removed centrally, as described in said application, or by any other suitable means.

I do not seek to cover herein, broadly, the use of a vortex movement for effecting the separation of the solid and liquid materials, as that feature is set forth in both of my concurrent applications, Serial No. 334,175, filed December 18, 1889, and Serial No. 334,666, of December 23, 1889, above referred to, the duplex use of the vortex movement herein set forth being incidental to the present improved process, and it may even be dispensed with without detracting from the independent value of the features of imparting the heat for effecting the evaporation within the vacuum-chamber to the liquid under treatment within a closed boiler or other form of closed heater and forcibly circulating it between said heater and the vacuum-chamber below the liquid-level in said apparatus, as herein set forth.

In my patents, Nos. 426,139 and 426,140, patented April 22, 1890, and in subsequent pending applications I show and describe apparatus for heating the liquid to be evaporated outside of the vacuum-chamber under atmospheric pressure, and also for creating a forced circulation of the liquid between the exterior heating-surface and the interior of the vacuum-chamber; but in such applications I claim the apparatus alone, whereas in the present application I claim the new and improved process of evaporating liquids as herein disclosed, which as an invention is concurrent with and correlated to the inventions set forth in said prior applications.

I am also aware that in my patent, No. 426,142, patented April 22, 1890, I claim as a step in the process therein set forth the feature of heating the brine under atmospheric pressure in an open tank, whereas in the present case I disclaim that method in so far as my present invention is concerned and confine myself to the heating of the liquid within an inclosed heater or boiler in such manner that an excess of heat or pressure may be imparted to the liquid prior to its introduction into the vacuum-chamber below the liquid-level therein.

In the accompanying drawings I show apparatus sufficient for the purpose of illustrating the practical operation of my improved process, although I do not confine myself to any special form or construction of parts, since it is obvious that various modifications in apparatus may be introduced without deviating materially from the essential features of my invention.

Figure 2:
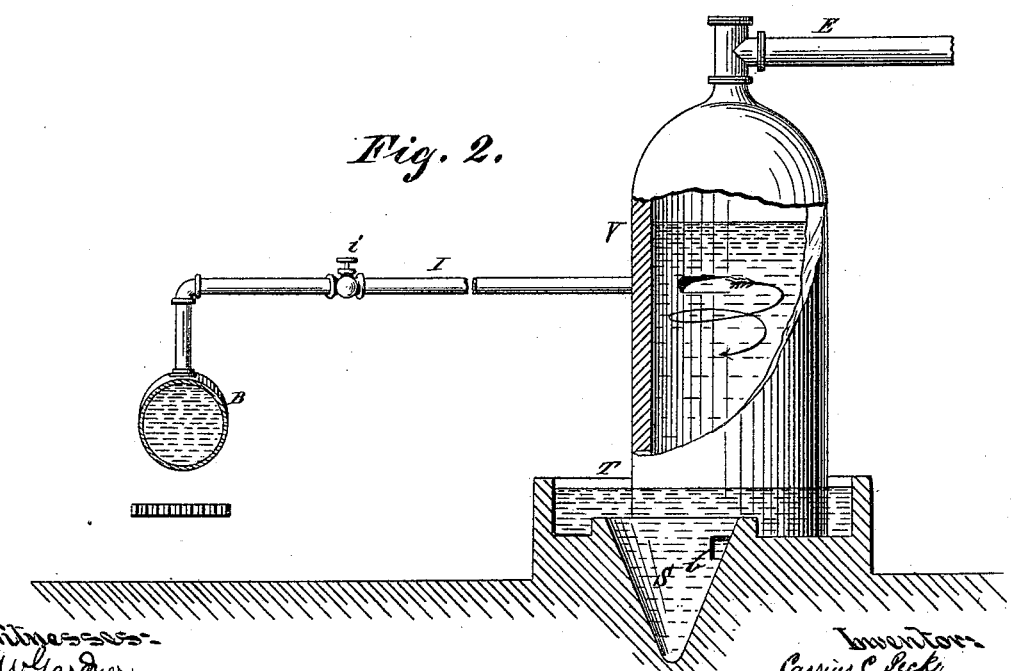
Figure 3:
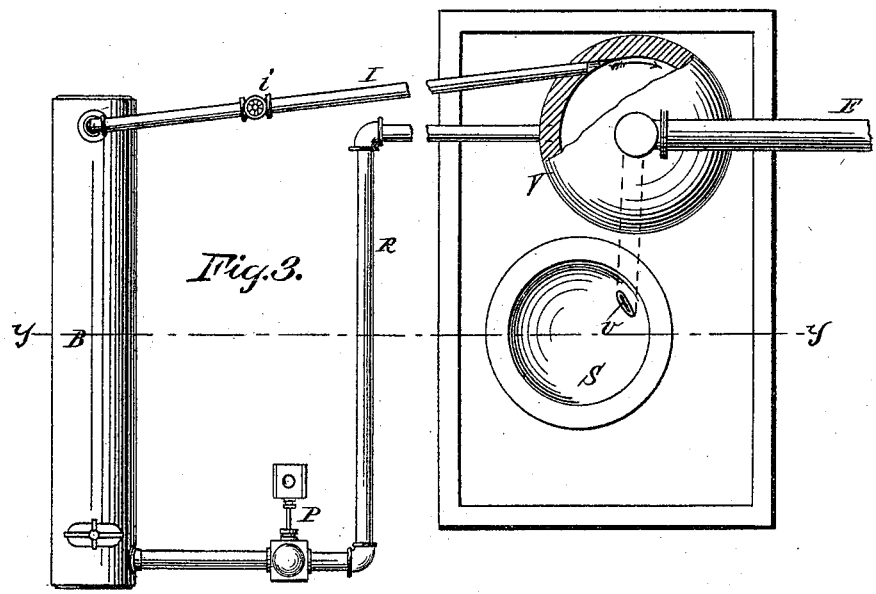
Figure 4:
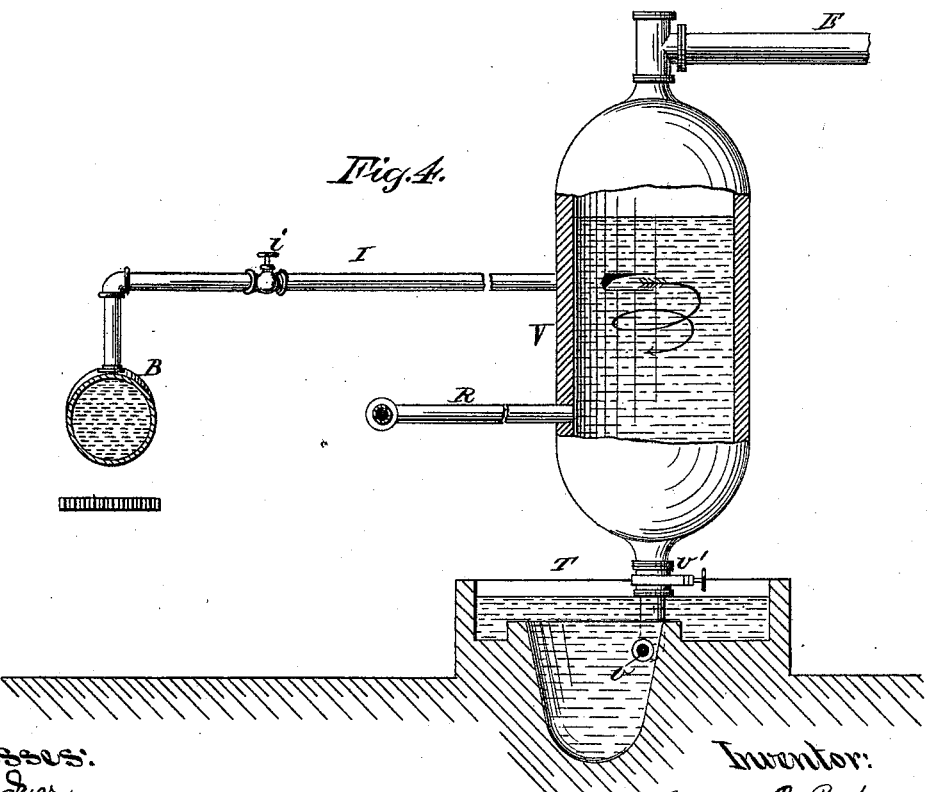

Figure 1 is a plan of apparatus adapted to the carrying out of my improved process, in which is an exterior open liquid-supply tank, which is also provided with a separating-basin for receiving the discharge from the vacuum-chamber. Fig. 2 is a vertical section upon plane of line $xx$, Fig. 1. Fig. 3 is a plan of a modified form of apparatus in which the unevaporated liquid is returned directly from the lower part of the vacuum-chamber to the heater. Fig. 4 is a vertical section upon plane of line $yy$, Fig. 3.

In the drawings, B represents, symbolically, a closed tank or boiler, in which the liquid to be evaporated is heated by any ordinary or well-known means. The form of this liquid-heating apparatus is of secondary importance, provided it is adapted to impart a high degree of heat to the liquid passing through it and is closed to the atmosphere.

The vacuum-chamber V is shown as situated in an open sealing-tank T, which also acts as a supply-tank for the introduction of fresh brine or other liquid into the circulation; but this sealing and supply tank T is not absolutely essential to the carrying out of my process as far as the circulation between the closed heater B and the vacuum-chamber V is concerned, since both the injection-pipe I and the return-pipe R may be connected directly with the vacuum-chamber, as shown in Figs. 3 and 4, instead of having the return-pipe R connected with the sealing and supply tank T, as in Fig. 1, the effect in either case being substantially the same as far as the augmentation of evaporation by the circulation between the closed boiler B and the vacuum-chamber V is concerned. This circulation of the liquid may of course be effected alone by the natural action of gravity, the hot liquid passing upward through the injection-pipe I into the vacuum-chamber V below the liquid-level therein, and that which remains unevaporated finally returning to the boiler B by means of a return-pipe R; but I prefer in most cases to impart a forced circulation of the liquid under treatment through and between the closed heater and the vacuum-chamber. This may be accomplished by the use of a force-pump P or equivalent means. The injection and return pipes may each be provided with a valve $i$ and $r$, for regulating the flow of the liquid.

It is obvious that the liquid under treatment may be injected from the boiler B into the vacuum-chamber V at any angle; but I prefer to inject it in a line which is substantially tangential to the inner wall of the vacuum-chamber V and below the liquid-level therein, so as to cause the liquid to rotate slowly within the said chamber, thereby, in connection with the central discharge below, creating a vortex movement which draws the more concentrated liquid and crystals to the central portion of the chamber, down which they descend axially to the bottom of the vacuum-chamber.

The upper portion of the vacuum-chamber is connected with an exhaust apparatus by the pipe E in the usual manner, and the lower extremity is provided with a discharge-passage $v$, through which the concentrated liquid and the crystals are delivered, preferably, into a separating-basin S. In lieu of discharging the products of evaporation into a separating-basin S, the latter may be dispensed with and such products may be discharged directly into the supply-tank T; or the discharge-passage $v$ may be provided with a valve $v'$, and such products, after the collection of a sufficient quantity in the bottom of the vacuum-chamber V, may be discharged at suitable periods into any convenient receptacle, as heretofore. When the separating-basin is used, the discharge-passage is made to enter it in a line which is substantially tangential to its sides, as indicated in the drawings, thus insuring a gyratory movement of the discharged products of evaporation within the basin S, by which means the crystals are collected for removal centrally, as described in my application, Serial No. 334,666, filed December 23, 1889.

By the use of the closed heating apparatus B a higher temperature may be imparted to the liquid to be evaporated as compared with my system of treating the liquid in an open tank, and the rapidity and effectiveness of the process will be thereby increased.

By using the tangential delivery into the vacuum-chamber, and thereby creating a slow whirling motion of the liquid under treatment within said chamber, and at the same time arranging the discharge-passage below centrally with relation to the chamber, I not only draw the crystals as formed downward, but also favor the production of crystals of uniform size by giving the liquid a steady even motion in one direction, thus preventing the agitation occasioned by opposing currents.

It will be readily understood that in so far as the gyratory movements of the liquid in the vacuum-chamber and separating-chamber are concerned it is immaterial whether the heat for effecting the evaporation is imparted to the liquid in an open or closed heater.

What I claim as my invention, and desire to secure by Letters Patent, is—

1. The process of augmenting the evaporation of liquids herein set forth, consisting in imparting a comparatively high degree of heat to the liquid under treatment in a closed heater, injecting said heated liquid into the vacuum-chamber below the liquid-level therein, and returning the unevaporated liquid from the lower part of the vacuum-chamber to the said independent heater, for the purpose and substantially in the manner set forth.

2. The process of augmenting the evaporation of liquids herein set forth, consisting in imparting the heat to effect the evaporation within the vacuum-chamber to the liquid in a separate closed heater, introducing the heated liquid into the said vacuum-chamber below the liquid-level therein, and returning the unevaporated liquid from the lower part of the vacuum-chamber to the independent heater in such manner as to create a continuous circulation and evaporation, substantially in the manner described.

3. The process of augmenting the evaporation of liquids herein set forth, consisting in imparting the heat to effect the evaporation within the vacuum-chamber to the liquid in a separate closed heater, injecting the heated liquid into the said vacuum-chamber below the liquid-level therein, and returning the unevaporated liquid from the lower part of the vacuum-chamber to the independent heater, so as to create a continuous process of evaporation by means of a forced circulation of the liquid under treatment, substantially in the manner described.

4. The process of evaporating liquids, substantially as herein set forth, consisting in imparting the heat to effect the evaporation in the vacuum-chamber to the said liquid in a separate heater, and injecting said heated liquid into the vacuum-chamber in a line substantially tangential thereto for the purpose of creating a comparatively slow rotation of the liquid in the vacuum-chamber to promote the formation of crystals of uniform size and structure.

5. The process of evaporating liquids, substantially as and for the purpose herein set forth, consisting in imparting the heat to effect the evaporation in the vacuum-chamber to the said liquid in a separate heater, injecting said heated liquid into the vacuum-chamber in a line substantially tangential thereto for the purpose of creating a comparatively slow rotation of the liquid in the vacuum-chamber to promote the formation of crystals of uniform size and structure, discharging the crystals axially from the lower part of the vacuum-chamber, and returning the unevaporated liquid to the exterior heater to be reheated and again introduced into the vacuum-chamber.

6. The process of evaporating liquids herein set forth, consisting in imparting the heat to effect the evaporation of the liquid within the vacuum-chamber to the said liquid by means of an exterior heater, introducing the heated liquid into the vacuum-chamber, and discharging the products of evaporation therefrom into a separating-basin in a line substantially tangential thereto to produce a comparatively slow rotation of the liquid in said separating-chamber for the purpose of promoting the separation of the solid products of evaporation from their liquid constituent, substantially as described.

7. The process of evaporating liquids herein set forth, consisting in imparting the heat to effect the evaporation of the liquid within the vacuum-chamber to the said liquid by means of an exterior heater, introducing the heated liquid into the vacuum-chamber, discharging the products of evaporation therefrom into a separating-basin in a line substantially tangential thereto to produce a comparatively slow rotation of the liquid in said separating-chamber to promote the separation of the solid products of evaporation from their liquid constituent, and returning said liquid constituent to the said exterior heating apparatus to be reheated and again introduced into the vacuum-chamber, substantially in the manner described.

CASSIUS C. PECK.

Witnesses:
  GEO. W. MIATT,
  D. W. GARDNER.